United States Patent
Elmhirst et al.

[11] Patent Number: 5,826,295
[45] Date of Patent: Oct. 27, 1998

[54] WINDSCREEN WIPERS

[75] Inventors: John Elmhirst, Hucclecote; Denis J. Kirkby, Charlton Kings, both of England

[73] Assignee: Wynn Marine Ltd., Gloucestershire, England

[21] Appl. No.: 727,430

[22] PCT Filed: Mar. 30, 1995

[86] PCT No.: PCT/GB95/00728

§ 371 Date: Oct. 11, 1996

§ 102(e) Date: Oct. 11, 1996

[87] PCT Pub. No.: WO95/27641

PCT Pub. Date: Oct. 19, 1995

[30] Foreign Application Priority Data

Apr. 11, 1994 [GB] United Kingdom .................... 9407111

[51] Int. Cl.⁶ ...................................................... B60S 1/44
[52] U.S. Cl. .................................... 15/250.24; 15/250.29; 15/250.17; 318/DIG. 2; 318/444; 318/443
[58] Field of Search ........................... 15/250.12, 250.13, 15/250.29, 250.24, 250.3, 250.16, 250.17; 318/443, DIG. 2, 444

[56] References Cited

U.S. PATENT DOCUMENTS

| | | | |
|---|---|---|---|
| 3,042,954 | 7/1962 | Wynn et al. ........................... | 15/250.29 |
| 4,599,546 | 7/1986 | Uemura ............................... | 318/DIG. 2 |
| 4,663,575 | 5/1987 | Juzswik et al. ........................... | 318/444 |
| 4,665,488 | 5/1987 | Graham et al. ..................... | 318/DIG. 2 |
| 5,225,752 | 7/1993 | Yasuda et al. ...................... | 318/DIG. 2 |

FOREIGN PATENT DOCUMENTS

| | | |
|---|---|---|
| 0302343 | 7/1987 | European Pat. Off. . |
| 2658460 | 2/1990 | France . |
| 2659579 | 12/1976 | Germany . |
| 1502199 | 2/1978 | United Kingdom . |
| 1490597 | 11/1997 | United Kingdom . |
| 9205054 | 4/1992 | WIPO . |

*Primary Examiner*—Gary K. Graham

[57] ABSTRACT

A straight line wiper of the kind where a belt or chain drive (1) on two pulleys or gear wheels (2, 3) and driven by a motor (10), drives a wiper (4, 5) along a straight line path driven by movement of the upper flight of the belt (1) in one direction and by the lower flight in the reverse direction between two ends of stroke potions (6, 7). The apparatus includes a motor speed profile arrangement which reduces the speed of the motor (10) as the wiper (4, 5) approaches each end of stroke position (6, 7) and increases the motor speed as the wiper (4, 5) moves away from each end stroke position (6, 7).

6 Claims, 1 Drawing Sheet

WINDSCREEN WIPERS

This invention relates to a straight-line windscreen wiper of the type used on large marine vessels.

BACKGROUND OF THE INVENTION

A straight-line wiper offers the advantage of a swept area that can cover substantially the whole window being wiped. Also it can be constructed in a robust form so as to deal with extreme conditions.

The wiper generally uses a continuous drive means in the form of a belt which runs between two equal sized pulley wheels. Alternatively the continuous drive means may be a chain running on sprocket wheels.

The blade of the wiper is fixed to a wiper carriage which runs and is guided in a casing, and which is attached by an appropriate linkage to the belt. One of the wheels is free to rotate on its bearings while the other is driven by an electric motor, or both may be driven, so that the carriage moves in a linear path along the casing. Referring to FIG. 1 of the accompanying drawings, the motion of the carriage is reversed at each end (a, and b) of stroke by the motion of the carriage attachment point being transferred from the upper to the lower flight and vice versa. The motor is generally run at one speed w, so the velocity V of the carriage (and hence of the wiper blade) is as shown in FIG. 1 of the accompanying drawings.

The rate of change of velocity f (i.e. acceleration) is shown in FIG. 2. The value at the end of stroke is large, typically 5 g. The large value is currently accommodated by the use of damping mechanisms, and by limiting the size of the wiper arm and blade (and hence inertia) to values such that there is an acceptable life and acceptable levels of the physical manifestation of acceleration and deceleration shocks.

The problem of large start up and slow down shock is particularly acute with heavy duty marine wipers, because of the extreme conditions which are encountered. In particular, the system needs to be extremely robust and a high pressure has to be applied to the wiper blade to ensure reliable operation in adverse weather conditions which are accentuated by salt or icing.

SUMMARY OF THE INVENTION

In accordance with the present invention, there is provided a heavy duty wiper device which includes a continuous drive means operating over spaced wheels, a wiper carriage driven by the continuous drive means so as to travel in a to and fro motion between first and second end of travel positions and which is adapted to change the direction of drive by transferring the drive between upper and lower lights of the continuous drive means, and a drive motor for driving at least one of the spaced wheels unidirectionally, characterized by speed profiling means for controlling the speed of the motor, the speed profiling means being arranged to control the motor speed so as to perform an operational to and fro cycle where in a region at each end of the travel of the wiper carriage the motor speed is, over a selected period of time, smoothly increased from a low speed to an operational speed as it leaves each end of travel position and is smoothly reduced from the operational speed to the low speed as it approaches each end of travel position.

A variable speed of operation is often provided in current designs. This is achieved by crude (open-loop) regulation of the motor speed using a speed setting control which reduces the average current fed to the motor (generally either dc or series-wound ac). In conjunction with the essentially constant wiper torque demand, this results in a lower average speed.

By sensing the position of the carriage, it is possible to provide a profiled decrease of motor speed on approach to an end of motion, and a subsequent increase back to the normal speed for the motion across the main travel.

Most systems also incorporate a 'park' position sensor, such that on reaching that end of stroke the motor is caused, in a simple control circuit, to be stopped.

One simple method of achieving the smoothed action according to the invention is to make use of this park position sensor P to engage a speed demand profile as shown in FIG. 3. In a proposed embodiment, this profile is generated using a microcontroller, whose output drives an $E^2$-potentiometer. By sensing the relative timing of the end of its time based profile and the occurrence of another park sensor signal, the system can adjust itself so that the end of its profile is kept close to the start of the next profile.

Alternative possibilities are as follows:

1. A motor with encoder (simple pulse generator) enhances the accuracy of the position of speed change and can be used for more precise closed-loop motor speed control. One physical carriage position sensor is still needed.

2. A toothed belt in combination with 1 above would give even more certainty of position of the carriage. A sensor picking up the motion of the belt (optically from the tooth profile of the belt or the pulley) can be used in place of the motor encoder and thus offer the most direct positional data.

3. Schemes 1 or 2 can be used in combination with an inverter drive i.e. a drive that controls the speed of the (lower cost and more rugged) induction motor, by the alteration of supply frequency. Usually this will comprise a rectifier to convert the supply to DC and a solid state inverter which converts the supply back to AC at a variable frequency.

4. The profile of the speed can be made to simulate simple harmonic motion, and thus give the appearance of a natural oscillating motion with smooth acceleration to a maximum position followed by a corresponding smooth deceleration.

In summary, the invention provides control of linear blade speed local to the end of travel on a straight line wiper thus reducing the end of stroke shocks, thereby allowing larger blades and arms to be used for a given casing and carriage mechanism, thereby extending the range of capability, and furthermore reducing the noise generated and enhancing the life of the wiper system. Control of speed throughout the travel of the wiper can be used to generate simple harmonic motion, or merely at the end of travel zones.

For a fuller description of existing straight-line wipers reference is made to the Wynstruments patent specifications, for example No. GB 1,490,597. Therein, a plate carriage and its associated wiper blade are given a true to-and-fro rectilinear motion by a driving link pivotally secured to the plate and pivotally secured to an element connected to a belt (continuous drive means), the element having a part-cylindrical surface radius approximating to the radii of pulleys (wheels) supporting the belt so that it will pass easily over the latter. It will be appreciated that during the travel of the carriage in one direction the link will be in tension and during the return movement in compression.

DETAILED DESCRIPTION OF THE INVENTION

Figure 4:
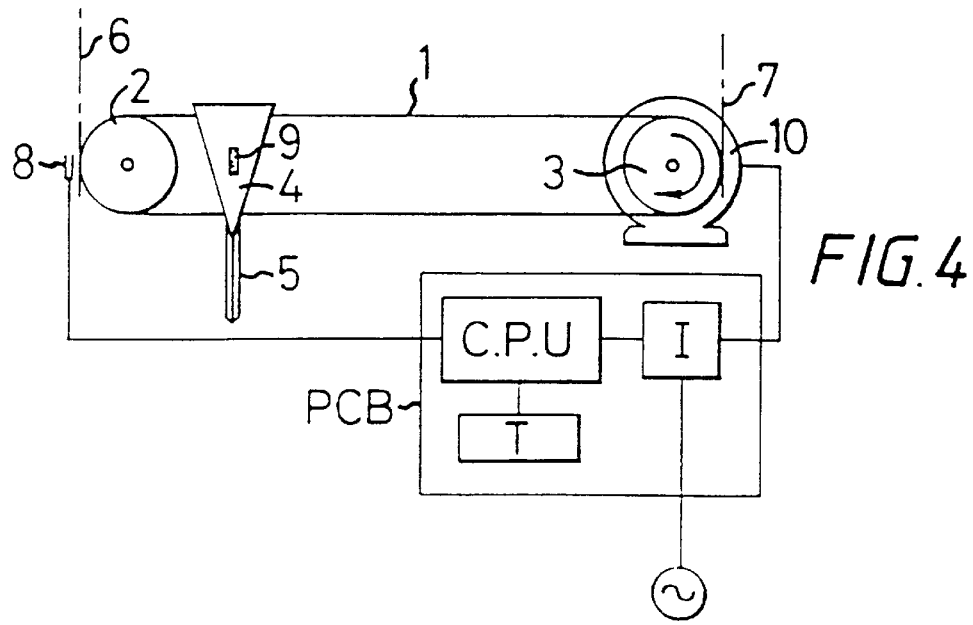
FIG. 4 shows a schematic diagram of a wiper mechanism incorporating the present invention.

An embodiment of the invention will now be described by way of an example with reference to FIG. 4 of the drawings which shows a schematic diagram of a wiper mechanism incorporating the present invention.

Continuous drive means 1 in the form of a continuous belt operates over spaced pulley wheels 2 and 3 to carry a wiper carriage 4 including a wiper blade 5 to cause it to travel in a to and fro motion between end of travel points 6 and 7 while running on a slide track (not shown). The mechanism is essentially as described in our earlier British patents numbers 1490597 and 1502199 utilizes a motor 10 which drives the right hand pulley 3. With this arrangement the upper flight of the continuous belt 1 drives the carriage from left to right until it reaches and end of travel position 7 when it is brought back on the lower flight of the belt until it again reaches the end of travel position 6.

A park sensor 8 in the form of a reed switch is located at the first extremity position 6 and is operated by a magnet 9 carried by the carrier 4. In a normal wiper mechanism the reed switch 8 is wired in parallel with a park switch which when opened enables the carrier to continue movement until it reaches its end of travel at which point the read switch opens and current to the motor is cut off. The present invention makes use of this reed switch 8.

At this point it should be noted that the reed switch 8 is shown at the left hand end of the travel, however it could be at either the free running left hand end or the right hand driven end, since the motions at each end are the same and a continuous symmetrical speed profile occurs in each direction of travel.

The speed profiling means is shown schematically as a block diagram. A central processing unit CPU, into which a timer T and the reed switch output are fed, generates the speed profile in the manner previously discussed and this profile is fed to an inverter I which then feeds the speed controlled supply from an AC supply to the motor 10.

Figure 1:
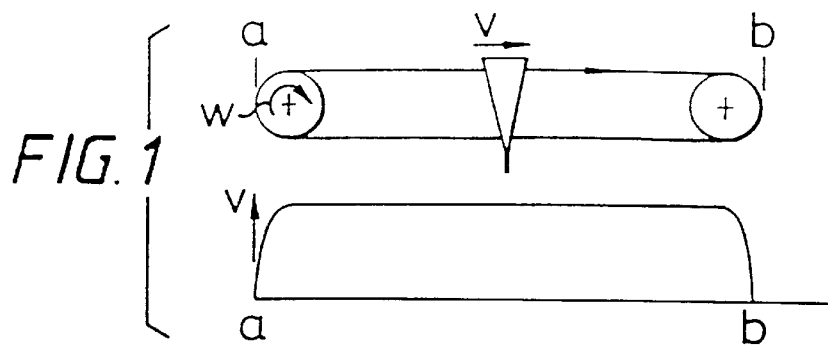
FIG. 1 shows the carriage reversal at each end of a wiper stroke and the effect on velocity thereof.
Figure 2:
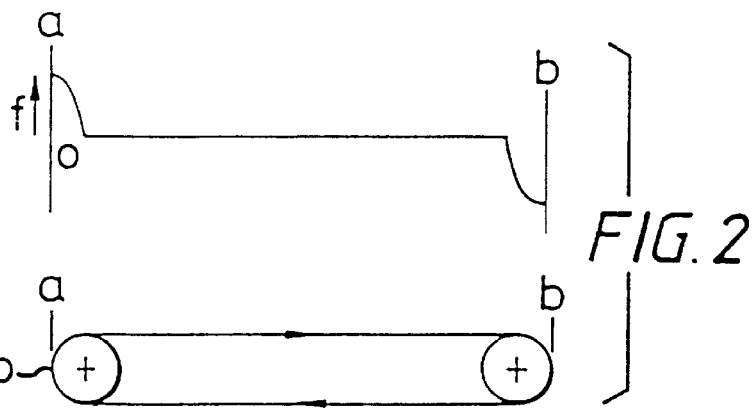
FIG. 2 shows the rate of change of velocity of the wiper carriage with respect to a wiper stroke.
Figure 3:
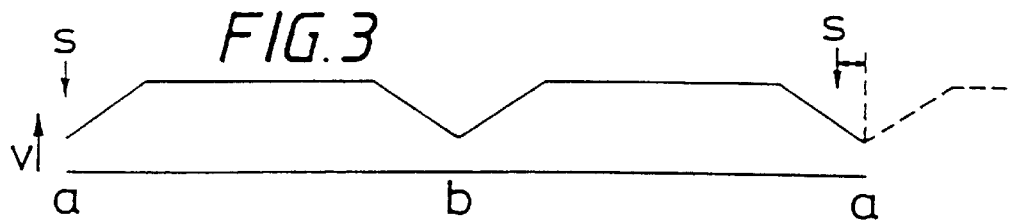
FIG. 3 shows a speed demand profile using a park position sensor in a method of achieving the smooth action according to the invention.

Referring to FIG. 3, the reed switch 8 provides a signal at the start of the to and fro cycle and again at the end, i.e. when the carrier again reaches the position 6 areas. The difference between the actual time of the signal S and the adjacent minimum point in the cycle is then used to correct the time period for the next cycle, so that synchronization is maintained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A heavy duty wiper device which includes a continuous drive means operating over spaced wheels, a wiper carriage driven by said continuous drive means so as to travel in a to and fro motion between first and second end of travel positions, and which is adapted to change the direction of drive by transferring the drive between upper and lower flights of the continuous drive means, a drive motor for driving at least one of said spaced wheels unidirectionally, speed profiling means for controlling the speed of said motor, said speed profiling means controlling an operational to and fro cycle where in a region at each end of the travel of said wiper carriage the motor speed is, over a selected period of time, smoothly increased from a low speed to an operational speed when moving from one of said first and second end of travel positions and is smoothly reduced from the operational speed to the low speed when approaching the other of said first and second end of travel positions, and a park sensor for sensing the region at one of said first and second end of travel positions of said wiper carriage and coupled with said profiling means to enable said wiper carriage to stop at a park position, wherein said park sensor also synchronizes operation of said speed profiling means.

2. The heavy duty wiper device according to claim 1 wherein said speed profiling means controls a speed profile such that in said operational cycle the motor speed increases smoothly from a low speed at a first end of travel position to an operations speed, continues at the operations speed until approaching a second end of travel position where it smoothly reduces to a low speed at the second end of travel position and then repeats the same speed profile as it returns from the second end of travel position and again reaches the first end of travel position.

3. The heavy duty wiper device according to claim 1 wherein said operational cycle is a simple harmonic motion.

4. The heavy duty wiper device according to claim 1 further including switching means for changing between a plurality of operational speed modes selected from a group consisting of intermittent wipe, high speed, intermediate speed and self park, each of which uses at least a part of said operational cycle.

5. The heavy duty wiper device according to claim 1 wherein said speed profiling means includes AC supply means and an inverter for controlling the speed of said motor in accordance with said operational cycle.

6. The heavy duty wiper device according to claim 1, wherein an interval region is between said regions at said first and second end of travel positions, and said speed profiling means only controllingly modifies speed in said regions at said first and second travel positions.

* * * * *